United States Patent [19]

Dearden et al.

[11] Patent Number: 4,471,454
[45] Date of Patent: Sep. 11, 1984

[54] FAST, EFFICIENT, SMALL ADDER

[75] Inventors: Ziba T. Dearden, Manassas; Yogishwar K. Puri, Vienna; William W. Sproul, III, Reston, all of Va.

[73] Assignee: IBM Corporation, Armonk, N.Y.

[21] Appl. No.: 315,826

[22] Filed: Oct. 27, 1981

[51] Int. Cl.³ .......................... G06F 7/48; G06F 7/50
[52] U.S. Cl. ..................................... 364/786; 364/784
[58] Field of Search ... 364/200 MS File, 900 MS File, 364/768, 786, 764, 784

[56] References Cited

U.S. PATENT DOCUMENTS

| | | | |
|---|---|---|---|
| 3,932,734 | 1/1976 | Parjons | 364/786 |
| 4,010,359 | 3/1977 | Weber et al. | 364/768 |
| 4,071,905 | 1/1978 | Oguchi et al. | 364/784 |
| 4,110,832 | 8/1978 | Leininger et al. | 364/786 |
| 4,272,828 | 6/1981 | Negi et al. | 364/768 |
| 4,276,608 | 6/1981 | Stakhov et al. | 364/768 |
| 4,422,157 | 12/1983 | Uhlenhoff | 364/786 |
| 4,435,782 | 3/1984 | Kaufman et al. | 364/784 |

Primary Examiner—Gareth D. Shaw
Assistant Examiner—John G. Mills
Attorney, Agent, or Firm—John E. Hoel

[57] ABSTRACT

A digital adder circuit is disclosed which employs non-DC current configurations to significantly reduce power, device count, and delay in performing binary addition. The circuit features a carry propagate transfer FET device whose gate is controlled by a carry propagate control circuit which selectively gates on the transfer FET device at a particular adder bit stage when the carry-in binary bit is to be transferred as the carry-out binary bit, which takes place when the augend input bit and addend input bit at that stage are not equal. The circuit additionally features a carry generate control circuit which is connected to the carry-out node of the FET transfer device, which selectively connects that node to either a drain potential when both inputs are unity or to ground potential when both inputs are zero, thereby efficiently generating the carry-out bit without regard for the state of the carry-in bit. When the input bits are not equal, the carry generate control circuit has a high impedance state so that it will not affect the propagation of the carry-in bit through the FET transfer device. The resultant adder circuit has a reduced power dissipation, a reduced signal delay, and a reduced device count when compared with prior art FET adder circuits.

2 Claims, 5 Drawing Figures

FAST, EFFICIENT, SMALL ADDER

FIELD OF THE INVENTION

The invention disclosed broadly relates to arithmetic circuitry and more particularly relates to an improved FET circuit for an adder.

BACKGROUND OF THE INVENTION

With the advent of large scale integrated circuitry, the capability is at hand to embody entire computer processors on a single semiconductor chip. Arithmetic processing, local storage functions, and I/O functions can be integrated onto a single semiconductor chip to perform four-bit, eight-bit or 16-bit operand computations. As more functions are desired to be condensed onto the same semiconductor chip, the circuit density, and therefore the power dissipation per unit area, increases dramatically. Power dissipation levels oftentimes present a barrier to further consolidation of arithmetic functions in an integrated circuit. Many attempts have been made in the prior art to improve upon the architecture and circuit topology of arithmetic processing elements in order to increase their circuit density and reduce their power dissipation per unit area when integrated on a semiconductor chip.

Fette, et al. U.S. Pat No. 3,843,876 discloses a digital adder having a high speed carry propagation line. An FET adder circuit is shown in FIG. 2 of Fette, et al. which includes an FET transfer device 19 in the carry propagation path. The carry propagation control circuit includes an exclusive OR circuit consisting of devices 40, 41, 42, 43 and 44 which serve to control the conductivity of the transfer device 19. The Fette, et al. circuit is a clocked FET circuit and requires that the carry-in node 21 and the carry-out node 25 be periodically charged through the clocking devices 24 and 22, respectively. The carry generate control circuit consists of a connection between the node 16 of the carry propagate control circuit and the device 18, so as to conditionally discharge the carry-out node 25 when the binary input values A and B are both zero. The Fette, et al. circuit cannot operate faster than the repetition rate for the clocks which charge the carry propagate line, the circuit has a relatively high component count and the circuit has a relatively great power dissipation both through the additional load devices in the circuit and the on-chip clock driving circuitry.

Parsons U.S. Pat No. 3,932,734 shows an adder embodied in CMOS devices. There is a tri-state input to the carry propagate line 110. The gate 107, which is a pair of CMOS devices, provides the tri-state connection. At a particular stage, if X equals Y, the transfer gate 108 is off. The gate 107 conducts and line 106 inputs a positive potential to carry propagate line 110 when X equals Y equals one, or alternately gate 107 inputs a negative potential to carry propagate line 110 when X equals Y equals zero. If X does not equal Y, gate 107 does not conduct. In other words it is in a high impedance state. This is the third state for a tri-state operation of the gate 107. Transfer gate 108 passes the carry-in bit from the prior stage to the next stage. The carry bit will be propagated along the carry line for successive stages during the same interval. This advance of the Parsons patent over the Fette patent improves the speed of binary parallel adder circuitry, however the power dissipation and device count per adder stage is still quite high. When it is recognized that a binary parallel adder requires at least eight stages for simple adders and oftentimes 32 stages for 32-bit processors, any savings in device count and power dissipation per adder stage becomes significant. As can be seen with reference to FIG. 2 of the Parsons patent, each stage of the binary parallel adder requires an exclusive OR circuit and an AND circuit to supply the logical inputs to Parsons' input nodes 104, 105 and 106, respectively.

FIG. 3 herein, illustrates the Parsons' circuit with the transfer gates 107 and 108 and also a suggested N channel FET embodiment for the exclusive OR circuits and NAND circuits and inverter circuits within the logic box 103. It is seen that 12 transistors with four loads are required to provide the outputs on lines 104, 105 and 106 of the logic box 103. The attached FIG. 4 simplifies the transfer gates 107 and 108 to their N channel equivalents. It is seen that the same circuit elements are required in the box 103 to provide the logic signals on lines 104, 105 and 106, as are required in FIG. 3. It should be noted that the sum circuit 80 would contain Parsons' inverter 14 of two devices, inverter 15 of two devices, transfer gate 113 of one device and transfer gate 114 of one device, for a total device count for FIG. 4 of 20 N channel FET devices.

What is needed is an FET adder circuit which can efficiently perform the carry bit propagate function between consecutive bit stages of the adder while having a reduced power dissipation per unit area, a reduced device count, and a reduced signal delay.

OBJECTS OF THE INVENTION

It is therefore an object of the invention to provide an improved FET adder circuit.

It is still another object of the invention to provide an improved FET adder circuit which can efficiently perform the carry bit propagate function between consecutive bit stages.

It is yet a further object of the invention to provide an improved FET adder circuit which has a reduced power dissipation per unit area.

It is still a further object of the invention to provide an improved FET adder circuit which has a reduced device count.

It is yet a further object of the invention to provide an improved FET adder circuit which has a reduced signal delay characteristic.

SUMMARY OF THE INVENTION

These and other objects, features and advantages of the invention are accomplished by the fast, efficient, small adder circuit, disclosed herein. A digital adder circuit is disclosed which employs non-DC current configurations to significantly reduce power, device count, and delay in performing binary addition. The circuit features a carry propagate transfer FET device whose gate is controlled by a carry propagate control circuit which selectively gates on the transfer FET device at a particular adder bit stage when the carry-in binary bit is to be transferred as the carry-out binary bit, which takes place when the augend input bit and addend input bit at that stage are not equal. The circuit additionally features a carry generate control circuit which is connected to the carry-out node of the FET transfer device, which selectively connects that node to either a drain potential when both inputs are unity or to ground potential when both inputs are zero, thereby efficiently generating the carry-out bit without regard for the state of the carry-in bit. When the input bits are not equal, the carry generate control circuit has a high impedance state so that it will not affect the propagation of the carry-in bit through the FET transfer device. The resultant adder circuit has a reduced power dissipation, a reduced signal delay, and a reduced device count and operates on a different principle when compared with prior art FET adder circuits.

DESCRIPTION OF THE FIGURES

These and other objects, features and advantages of the invention will be more fully appreciated with reference to the accompanying figures.

DISCUSSION OF THE PREFERRED EMBODIMENT

A digital adder circuit is disclosed which employs non-DC current configurations to significantly reduce power, device count, and delay in performing binary addition. The circuit features a carry propagate transfer FET device whose gate is controlled by a carry propagate control circuit which selectively gates on the transfer FET device at a particular adder bit stage when the carry-in binary bit is to be transferred as the carry-out binary bit, which takes place when the augend input bit and addend input bit at that stage are not equal. The circuit additionally features a carry generate control circuit which is connected to the carry-out node of the FET transfer device, which selectively connects that node to either a drain potential when both inputs are unity or to ground potential when both inputs are zero, thereby efficiently generating the carry-out bit without regard for the state of the carry-in bit. When the input bits are not equal, the carry generate control circuit has a high impedance state so that it will not affect the propagation of the carry-in bit through the FET transfer device. The resultant adder circuit has a reduced power dissipation, a reduced signal delay, and a reduced device count when compared with prior art FET adder circuits.

Figure 1:
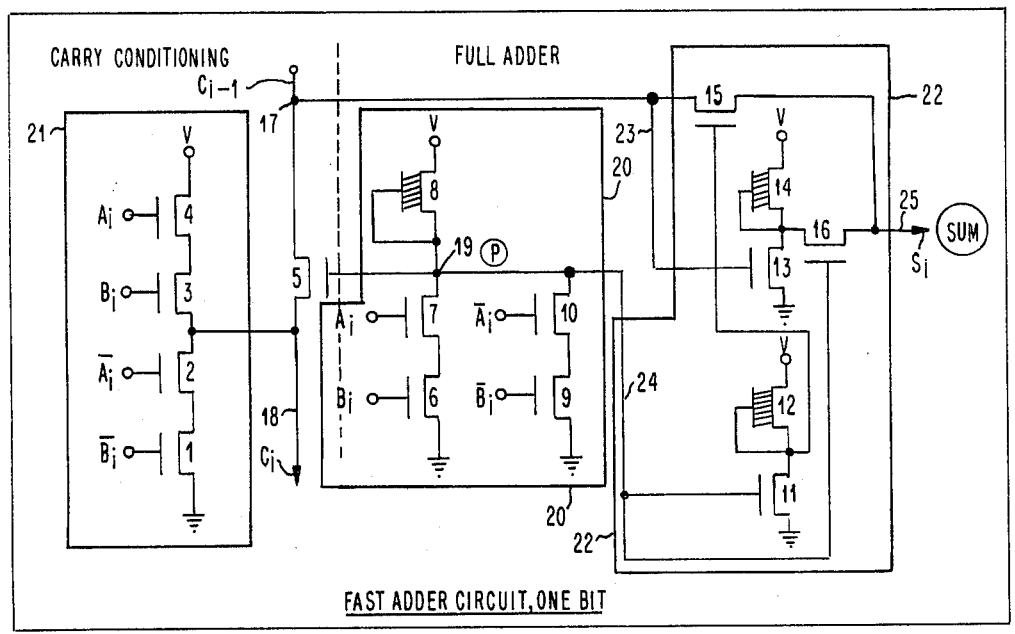
FIG. 1 is a circuit diagram of one bit stage of the fast adder circuit invention.
Figure 2A:
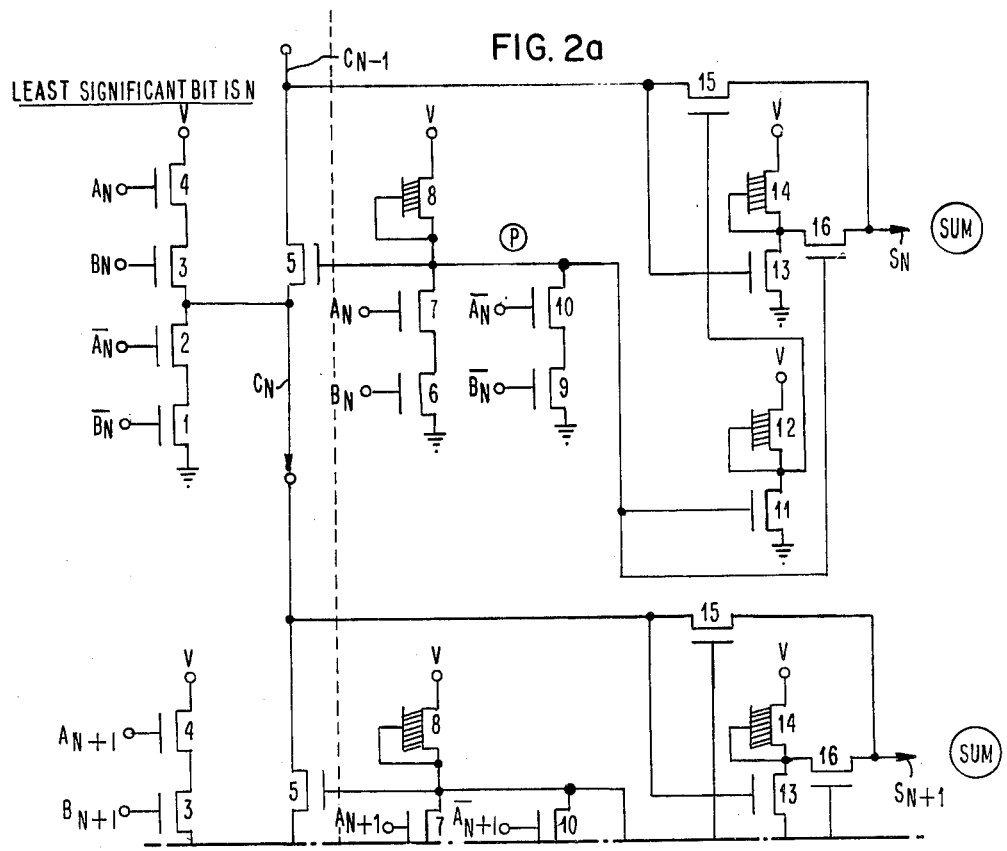
FIG. 2 is a circuit diagram illustrating the interconnection of four bit stages for the fast adder circuit invention.
Figures 2, 2B:
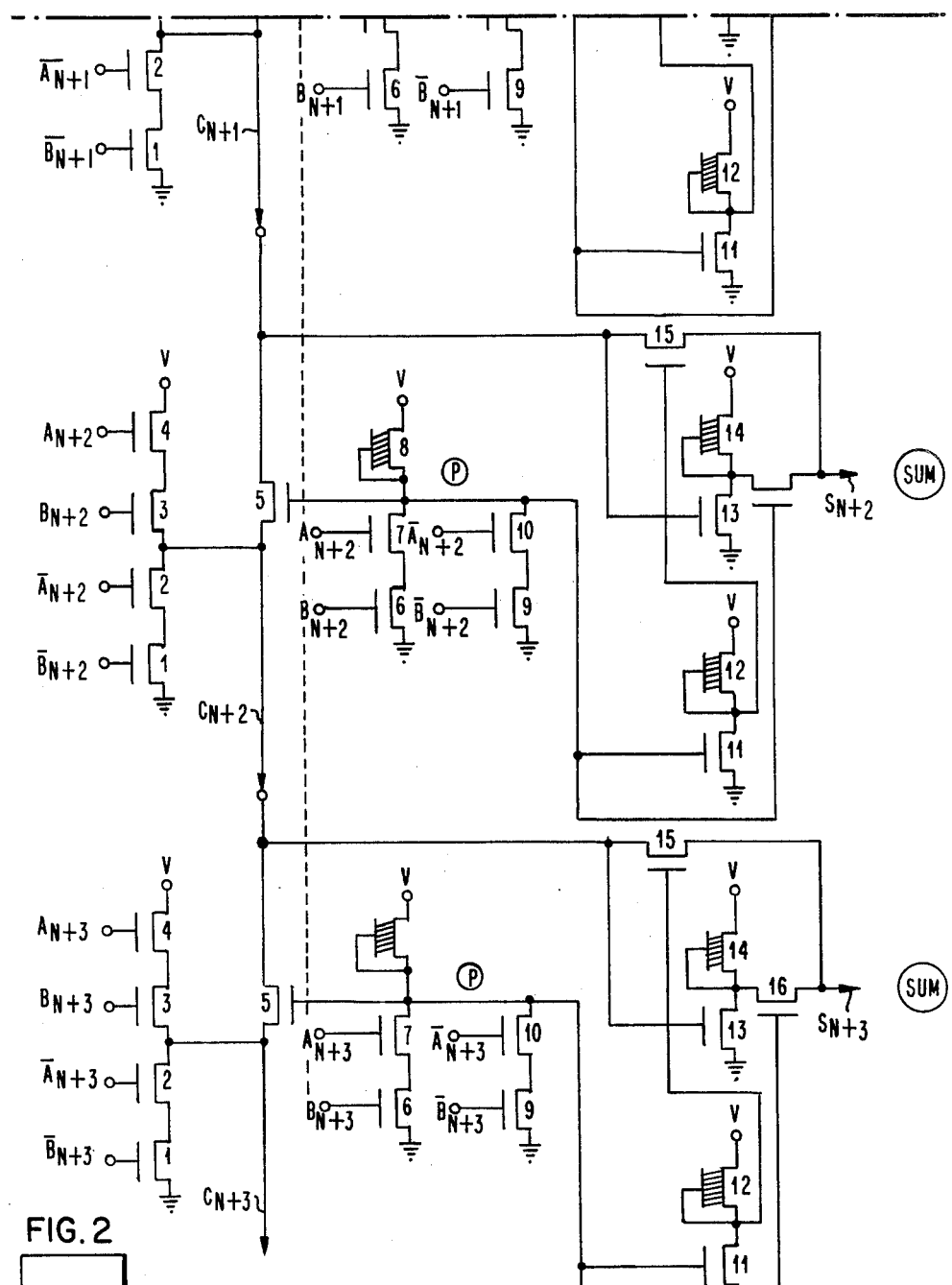

The digital adder including four parallel full adder stages shown in FIG. 2, has each ith stage, as is shown in FIG. 1, adapted to receive its associated addend input binary bit $A_i$ and its inverse $\overline{A}_i$, and its associated augend input binary bit $B_i$ and its inverse $\overline{B}_i$. Each ith stage as is shown in FIG. 1, has a carry-in binary bit $C_{i-1}$. Each stage provides a carryout binary bit $C_i$ and a sum output binary bit $S_i$.

As is shown in FIG. 1, each ith stage includes a carry propagate transfer FET device 5 which is an enhancement mode FET device having its drain connected to a carry input node 17 to receive the carry-in bit $C_{i-1}$, its source connected to a carry output node 18 to output the carry-out bit $C_i$, and its gate connected to a carry propagate control node $P_i$ 19.

Each ith stage further includes a carry propagate control circuit 20 which includes a load device 8 which is a depletion mode FET load device, connected between a drain potential V and the $P_i$ node 19, and a first series connected pair of enhancement mode FET devices 6 and 7 which are connected between the $P_i$ node 19 and ground potential. The gate of FET device 7 is connected to the $A_i$ input and the gate of the FET device 6 is connected to the $B_i$ input. The carry propagate control circuit 20 further includes a second series connected pair of enhancement mode FET devices 9 and 10 which are connected in parallel with the first pair of FET devices 6 and 7. Device 10 has its gate connected to the $\overline{A}_i$ input and device 9 has its gate connected to the $\overline{B}_i$ input. In operation, the carry propagate control circuit 20 selectively gates on the transfer FET device 5 when the binary value of $A_i$ does not equal the binary value of $B_i$. FIG. 1 also shows the ith stage including a carry generate control circuit 21 which includes a third series connected pair of enhancement mode FET devices 3 and 4 which are connected between the drain potential V and the carry output node 18. The gate of the FET device 4 is connected to the $A_i$ input and the gate of the FET device 3 is connected to the $B_i$ input. The carry generate control circuit 21 further includes a fourth series connected pair of enhancement mode FET devices 1 and 2 which are connected between the carry output node 18 and ground potential. The gate of the FET device 2 is connected to the $\overline{A}_i$ input and the gate of the FET device 1 is connected to the $\overline{B}_i$ input. In operation, the carry generate control circuit 21 selectively connects the carry output node 5 to the drain potential V when $A_i=B_i=1$ or alternately connects the carry output node 5 to ground potential when $A_i=B_i=0$. The carry generate control circuit 21 selectively provides a high impedance connection to the carry output node 5 when $A_i$ does not equal $B_i$.

As is seen in FIG. 1, the ith stage further includes an exclusive OR circuit 22 having a first input 23 connected to the carry input node 17 and a second input 24 connected to the $P_i$ node 19 and an output 25 which serves as the sum bit $S_i$ output.

The exclusive OR circuit 22 eliminates the DC current from the interconnection signal path. The exclusive OR circuit 22 includes two depletion mode load inverters, the first inverter including devices 13 and 14 and the second inverter including devices 11 and 12. The first logical input 23 is applied to the gate of the enhancement mode device 13 and the first inverter circuit produces at its output node an inverted signal which is applied to the source of the transfer device 16. The second depletion mode load inverter circuit has the logical input value at 24 input to the gate of the enhancement mode active device 11 and the common source/drain node between devices 11 and 12 serves as the inverting output node which applies the inverted signal to the gate of the transfer device 15. The enhancement mode FET device 16 is connected as a signal transfer device with its source connected to the output node of the first inverter circuit to transfer the inverted signal from line 23, and its gate is connected in common with the gate of the FET device 11 to the input logical signal 24. The second enhancement mode FET transfer device 15 has its source connected in common with the gate of the FET device 13, to the input variable 23, and its gate is connected to the output node of the second inverter so as to receive the inverted signal from the input 24 as its gating signal. The drains of the two transfer FET devices 16 and 15 are connected in common to the output node 25 to provide a sum $S_i$ for the circuit. In operation, the positive exclusive OR circuit 22 will transfer a positive signal to the output node 25, if and only if, one of the input signals 23 or 24 is positive, but not both. For example, if the input 23 signal is positive and the input 24 signal is negative, for N channel FET devices, the enhancement mode active device 13 will be turned on, producing an inverted signal at the output of the first inverter. If the input 24 signal is negative, the output of the inverter for devices 13 and 14 is not transferred to the output node 25. The negative input signal 24 keeps the enhancement mode FET device 11 off, thereby maintaining a positive potential at the output node of the second inverter for devices 11 and 12, so that transfer device 15 is on, thereby producing a positive output at 25. This satisfies the exclusive OR function. A similar operation takes place if the input 24 is positive and the input 23 is negative. If both the inputs 23 and 24 are either positive or negative, the output 25 is negative and therefore the sum bit $S_i$ is equivalent to a binary zero.

As is seen from the above, the FET adder circuit has an unusual configuration which enables it to efficiently perform the carry bit propagate function between consecutive bit stages of the adder by effectively providing a tri-state exclusive OR circuit as the carry generate control circuit and a bi-state exclusive OR circuit as a carry propagate control circuit. The circuit has a reduced power dissipation, a reduced device count, and a reduced signal delay when compared with other prior art adder circuits.

Reference to FIG. 2 will illustrate how the ith stage of the adder circuit can be combined into a plurality of N stages for N bit operand arithmetic operations. The illustration in FIG. 2 is of a four bit adder circuit.

The adder circuit shown in FIG. 1 uses a series arrangement of field effect transistors that carry no DC current, to achieve a fast carry and to enable the implementation of the add function with minimum power, device count and delay. The carry propagate control circuit 20 and the exclusive OR circuit 22 operate as a full adder whereby the sum output at 25 obeys the following binary equation:

$$S_i = A_i\overline{B}_i\overline{C}_{i-1} + \overline{A}_iB_i\overline{C}_{i-1} + \overline{A}_i\overline{B}_iC_{i-1} + A_iB_iC_{i-1}.$$

The carry propagate signal $P_i$ produced at the node 19 satisfies the binary equation:

$$P_i = A_i\overline{B}_i + \overline{A}_iB_i.$$

The carry generate control circuit 21 carries out the conditioning of the carry-out node 18 so that the potential at node 18 is the drain potential V minus the threshold potential $V_t$, where $V_t$ is the enhancement mode device threshold potential for the transfer device 5 and this condition will obtain when the following equation is satisfied:

$$C_i = A_iB_i + C_{i-1}(A_i\overline{B}_i + \overline{A}_iB_i).$$

Similarly, the potential at node 18 will be at ground potential when the following equation is satisifed:

$$\overline{C}_i = \overline{A}_i\overline{B}_i + \overline{C}_{i-1}(\overline{A}_iB_i + A_i\overline{B}_i).$$

It should be noted in FIG. 1, that when the binary value of $C_i$ at node 18 is established by FET devices 1 and 2 or by FET devices 3 and 4, the carry propagate transfer FET device 5 is nonconducting because the binary value of the carry propagate signal $P_i$ is simultaneously low. The circuit shown in FIG. 1 insures that no DC current flow will take place in a series string of carry propagate transfer FET devices 5 for a configuration of several adder stages, such as is shown in FIG. 2. If some degree of current leakage or charge dissipation takes place along a long carry propagate line 18 for a large plurality of series connected, one-bit stages as in FIG. 2, charge restoration circuits, for example a simple FET true driver, can be connected to line 18 at periodic intervals.

It should be further noted that the carry propagate transfer FET device 5 is only conducting when $A_i$ does not equal $B_i$, in which case it conducts a ground potential from the node 17 for $C_{i-1}$ to the node 18 for $C_i$ when no carry is to be propagated or alternately it conducts a high potential equal to $V - V_t$ when a carry is in fact to be propagated, as desired.

Figure 4:
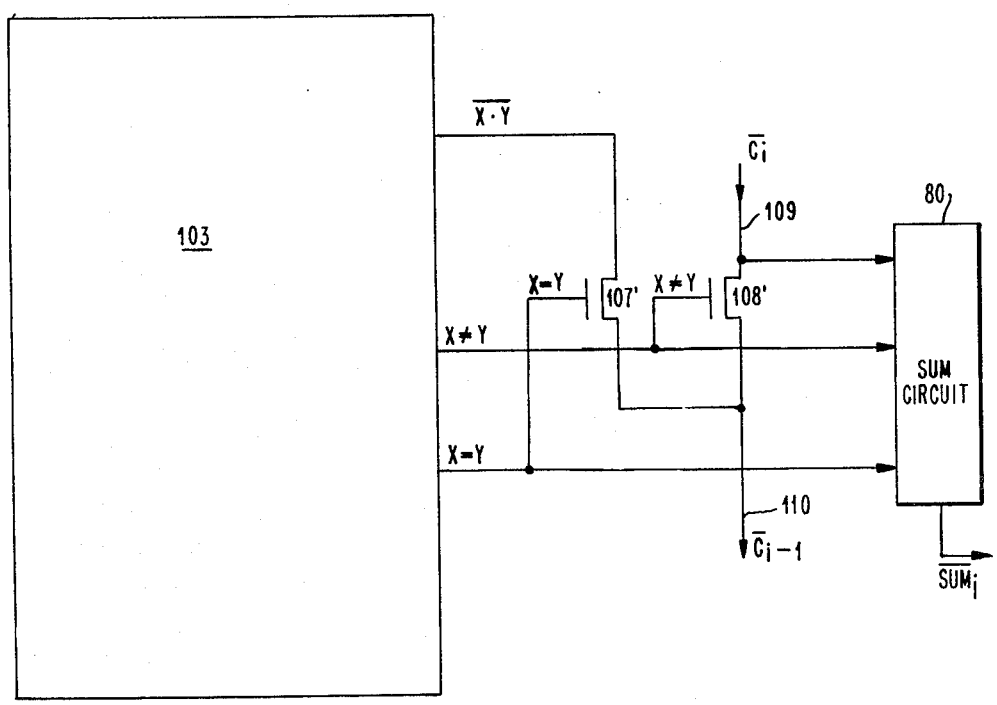
FIG. 4 is a modification of the circuit of FIG. 3, using NMOS devices.

Thus, each adder stage disclosed in FIG. 1 has a total device count of 16 devices which is a reduction of 20% over that of the modified Parsons' circuit of FIG. 4. Another difference between the modified Parsons' circuit shown in FIG. 4 and the fast adder circuit shown in FIG. 1 is the tri-state carry generate circuit 21 which forces the carry bit on the line 18 which is the carry out line for the carry propagate path. Since the source of the logic signals A and B are registers which are made up of latches which also provide $\overline{A}$ and $\overline{B}$, then no additional circuitry is required in FIG. 1 in order to produce the complement of A and B. The exclusive OR function which is required in the carry generate circuit 103 of FIG. 4 is transferred into the summing circuit as the exclusive OR 20 in FIG. 1. It is seen that the device count is thus reduced by approximately 20% per stage from 20 transistors for the Parsons' equivalent circuit in FIG. 4, to 16 devices as is shown in FIG. 1. In addition, there are 16 load devices which would be required in the Parsons' modified FIG. 4, four load devices in the logic box 103 and a load device for each inverter 14 and 15 in the summing circuit 80. In contrast, only three load devices, namely devices 8, 12 and 14 are required in FIG. 1. This amounts to a 100% reduction in the number of power dissipating load devices for each stage in the adder circuit.

Figure 3:
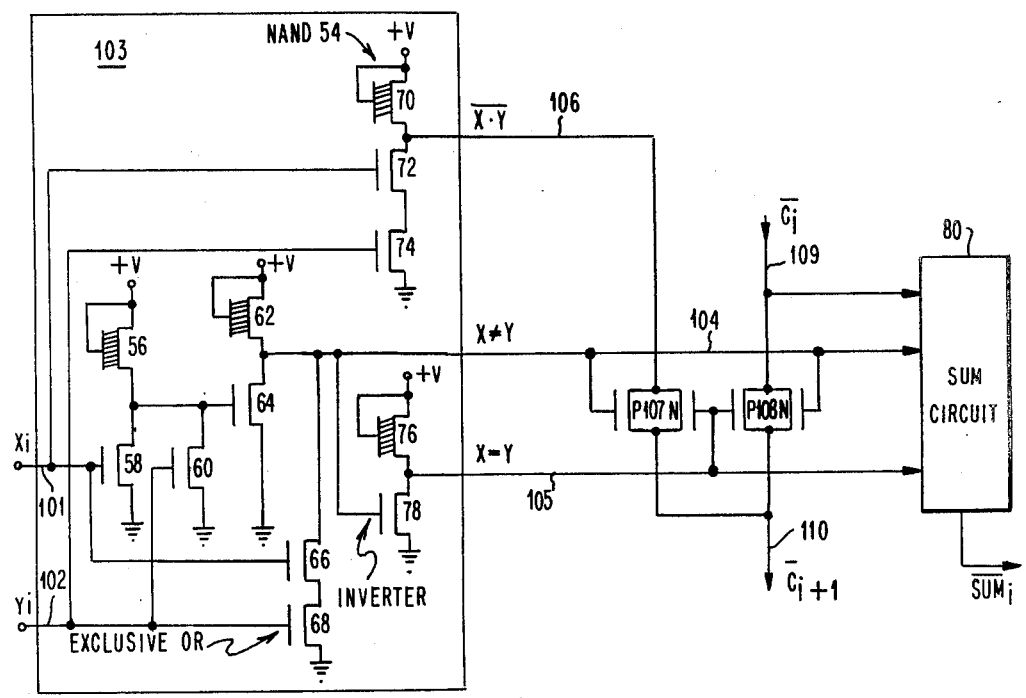
FIG. 3 is a circuit diagram illustrating the prior art Parsons adder circuit.

A speed improvement is also provided by the tri-state carry generate circuit 21 of FIG. 1. When $A_i$, $B_i$, $\overline{A}_i$ and $\overline{B}_i$ are valid, the tri-state carry generate circuit 21, after a short transfer gate delay which is shorter than a conventional load circuit delay, will simultaneously provide the logic function A and B, the logic function A exclusive OR B and the tri-state result which will be applied as the carry generate output to the carry bit line 18. Only four devices are required in the tri-state carry generate circuit in order to provide the tri-state output to the carry line 18. In contrast, referring to FIGS. 3 and 4, there are three load circuit delays which must take place before the exclusive OR circuit 50 and the inverter circuit 52 in the logic block 103 are capable of applying their signals to the N channel device 107' and the transfer device 108'. Thus, the overall circuit operation of the fast adder circuit of FIG. 1 will be faster than that described by Parsons, and shown in FIG. 3, even when modified to, as in FIG. 4, employ all N channel devices.

Although a specific embodiment of the invention has been disclosed, it will be understood by those of skill in the art that various changes in form and details may be made therein without departing from the spirit and the scope of the invention.

Having thus described our invention, what we claim as new, and desire to secure by Letters Patent is:

1. In a digital adder including N-parallel full adder stages, each ith stage adapted to receive its associated addend input binary bit $A_i$ and its inverse $\overline{A}_i$, its associated augend input binary bit $B_i$ and its inverse $\overline{B}_i$, and a carry-in binary bit $C_{i-1}$, for providing a carry-out binary bit $C_i$ and a sum output binary bit $S_i$, each said ith stage comprising:

a carry propagate transfer FET device having its drain connected to a carry bit input node to receive said carry-in bit $C_{i-1}$, its source connected to a carry bit output node to output said carry-out bit $C_i$, and its gate connected to a carry propagate control node $P_i$;

a carry propagate circuit including an FET load device connected between a drain potential and said $P_i$ node, a first series connected pair of FET devices between said $P_i$ node and ground potential with their gates respectively connected to said $A_i$ and $B_i$ signals and a second series connected pair of FET devices connected in parallel with said first pair, with their gates respectively connected to said $\overline{A}_i$ and $\overline{B}_i$ signals, for selectively gating on said transfer FET device when $A_i \neq B_i$, that is when $A_i$ and $B_i$ have opposite binary values, the $P_i$ node achieves a potential approximately equal to said drain potential;

a carry generate control circuit including a third series connected pair of FET devices between said drain potential and said carry output node with their gates respectively connected to said $A_i$ and $B_i$ signals and a fourth series connected pair of FET devices connected between said carry output node and said ground potential with their gates respectively connected to said $\overline{A}_i$ and $\overline{B}_i$ signals, for selectively connecting said carry output node to said drain potential when $A_i = B_i = 1$ or to said ground potential when $A_i = B_i = 0$ and selectively providing a high impedance connection to said carry output node when $A_i \neq B_i$ that is, when $A_i$ and $B_i$ have opposite binary values, one of said pair of FET devices in said third series will be off and one of said pair of FET devices in said fourth series will be off;

an exclusive OR circuit with a first input connected to said carry input node and a second input connected to said $P_i$ node and an output serving as a sum bit $S_i$ output, such that if $A_i = B_i = 1$ then said carry output node is forced to a binary one value, and if $A_i = B_i = 0$ then said carry output node is forced to a binary zero value;

whereby an improved digital adder circuit is formed.

2. In a digital adder including N-parallel full adder stages, each ith stage adapted to receive its associated addend input binary bit $A_i$ and its inverse $\overline{A}_i$, its associated augend input binary bit $B_i$ and its inverse $\overline{B}_i$, and a carry-in binary bit $C_{i-1}$, for providing a carry-out binary bit $C_i$ and a sum output binary bit $S_i$, each said ith stage comprising:

a carry propagate transfer FET device having a first source/drain terminal connected to a carry bit input node to receive said carry-in bit $C_{i-1}$, a second source/drain terminal connected to a carry bit output node to output said carry-out bit $C_i$, and its gate connected to a carry propagate control node $P_i$;

a carry propagate control circuit including an FET load device connected between a first potential and said $P_i$ node, a first series connected pair of FET devices between said $P_i$ node and a second potential with their gates respectively connected to said $A_i$ and $B_i$ signals and a second series connected pair of FET devices connected in parallel with said first pair, with their gates respectively connected to said $\overline{A}_i$ and $\overline{B}_i$ signals, for selectively gating on said transfer FET device when $A_i \neq B_i$, that is when $A_i$ and $B_i$ have opposite binary values, the $P_i$ node achieves a potential approximately equal to said drain potential;

a carry generate control circuit including a third series connected pair of FET devices between said first potential and said carry output node with their gates respectively connected to said $A_i$ and $B_i$ signals and a fourth series connected pair of FET devices connected between said carry output node and said second potential with their gates respectively connected to said $\overline{A}_i$ and $\overline{B}_i$ signals, for selectively connecting said carry output node to said first potential when $A_i = B_i = 1$ or to said second potential when $A_i = B_i = 0$ and selectively providing a high impedance connection to said carry output node when $A_i \neq B_i$, that is when $A_i$ and $B_i$ have opposite binary values, one of said pair of FET devices in said third series will be off and one of said pair of FET devices in said fourth series will be off;

an exclusive OR circuit with a first input connected to said carry input node and a second input connected to said $P_i$ node and an output serving as a sum bit $S_i$ output such that if $A_i = B_i = 1$ then said carry output node is forced to a binary one value, and if $A_i = B_i = 0$ then said carry output node is forced to a binary zero value;

whereby an improved digital adder circuit is formed.

* * * * *